March 10, 1931.    L. CIOMEI    1,796,139
CIRCUIT CLOSING APPARATUS
Filed Dec. 7, 1927
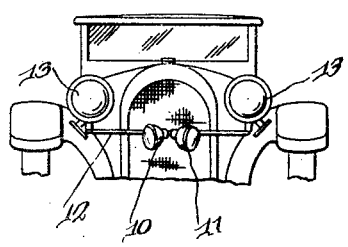
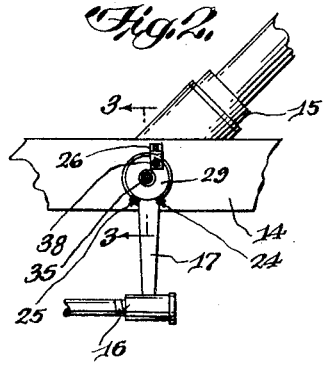
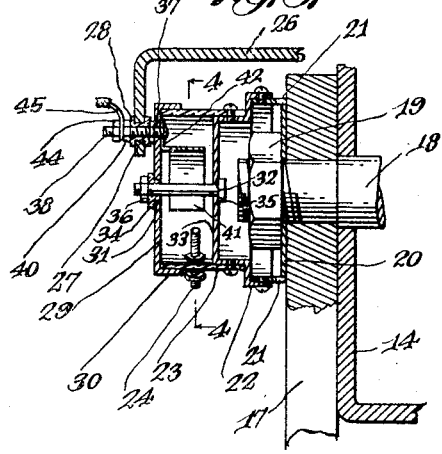
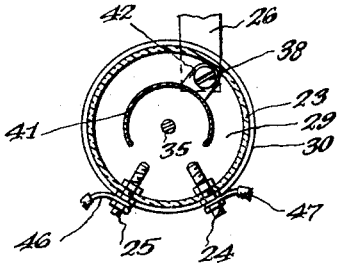
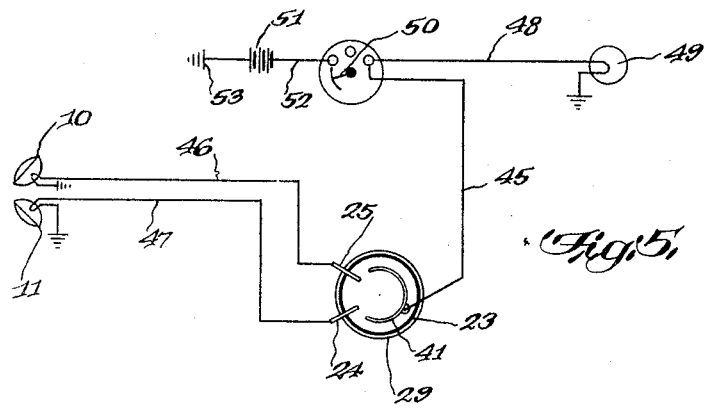
Lido Ciomei
INVENTOR
BY Victor J. Evans
ATTORNEY Patented Mar. 10, 1931

1,796,139

UNITED STATES PATENT OFFICE

LIDO CIOMEI, OF CHICAGO, ILLINOIS

CIRCUIT-CLOSING APPARATUS

Application filed December 7, 1927. Serial No. 238,375.

This invention relates to certain novel improvements in circuit closing apparatus and consists in improvements in such apparatus which is particularly adapted for use on automobiles.

The salient object of my invention is to provide a device of the above named character which will be particularly adapted for lighting the path to be traveled by an automobile when the same is turning a corner. At the present time the head lights of automobiles are so fixed to the fenders or in alignment with the chassis that the light being projected therefrom remains constantly parallel with the rear wheels of the vehicle and therefore when a corner is being turned this light beam is at an angle to the direction of travel and is therefore of little use.

Another object of the invention is to arrange my improved lighting apparatus such that it will function only at a time when the vehicle is turning a corner and my apparatus is so disposed and arranged that only the direction of travel is illuminated.

A further object of the invention is to provide a control means for my improved lighting apparatus which will be operated from the steering mechanism of a vehicle of the above named character.

Other objects will appear hereinafter.

The invention consists in the novel combination and arrangement of parts to be hereinafter described and claimed.

The invention will be best understood by reference to the accompanying drawings, showing the preferred form of construction and in which—

Fig. 1 is a fragmental front elevational view of an automobile embodying a preferred form of construction for my invention;

Fig. 2 is a side elevational view depicting one manner of mounting my improved controlling apparatus;

Fig. 3 is an enlarged sectional view taken on the line 3—3 on Fig. 2;

Fig. 4 is a sectional view taken on the line 4—4 on Fig. 3; and

Fig. 5 is a diagrammatic view illustrating the electrical connections employed in my device.

My improved lighting apparatus includes two lamp structures 10 and 11 which are adapted to be disposed at an angle to each other on the front of a vehicle. The lamps 10 and 11 are also adapted to be disposed at an angle to the normal course of the vehicle such that they will project a light beam either to the right or to the left in order that the path to be traveled by the vehicle, when turning a corner, shall be illuminated. The lamps 10 and 11 may be mounted in any desired manner such as that depicted in the accompanying drawings wherein a bracket rod 12 is directed across the vehicle and supported from the usual head light structures indicated by 13 in the drawings.

In order to control the operation of the lamps 10 and 11 I provide a novel switch structure which is adapted to be associated with the steering mechanism of the automobile. In the accompanying drawings the numeral 14 is used to generically indicate the chassis of an automobile. The numeral 15 generically indicates the steering column of such a device. The numeral 16 indicates the connecting rod which is adapted to connect the front wheels of the vehicle to the toggle arm 17. The toggle arm 17 is mounted on the spindle 18 which is part of the steering mechanism and which is suitably connected to the mechanisms contained within the steering column 15.

My improved control apparatus includes the disk 20 which is adapted to engage the toggle arm 17 and is mounted in juxtaposition thereto by removing the nut 19 and placing the disk 20 in engagement with the toggle arm 17 and then replacing the nut 19. The disk 20 includes ears 21 to which the supporting element 22 is secured. The supporting element 22 has a ring 23 of insulating material secured thereto and said ring extends outwardly from said supporting element. As is shown best in Fig. 4 two contact terminals 24 and 25 are mounted in spaced relation in the lower part of the insulating ring 23. It is therefore apparent that since the disk 20 is secured to the toggle arm 17 and inasmuch as the ring 23 is supported from the disk 20, that said ring 23 will turn in the direction in which the toggle arm 17 is moved which will obviously be in accordance with the direction in which the automobile is turned.

Supported from a suitable point on the vehicle is a bracket 26 which has an opening 27 formed in the downwardly extending leg thereof. A bushing 28 of insulating material is mounted in the opening 27. A cup 29 is provided which includes lip portions 30 which are disposed around the insulating ring 23 in order that said ring may freely turn in said cup 29. Cup 29 has a central opening 31 formed therein, and a co-operating opening 32 is provided in the wall 33 of the supporting member 22. A bushing 34, of insulating material, is mounted in the opening 31 and a bolt 35 extends through the opening 32 and the opening in the bushing 34 and a nut 36 is mounted on the end of said bolt and thus the cup 29 is clamped against the edges of the ring 23. An opening 37 is provided in the flat wall portion of the cup 29 and a bolt 38 is extended through this opening and a lock nut 39, on the bolt 38, locks the head of said bolt in engagement with the flat portion of the cup 29. The bolt 38 is extended through an opening in the bushing 28 and a nut 40 is mounted thereon and thus the cup 29 is securely fastened to the bracket 26.

An arcuate contact 41 has an ear 42 formed thereon which is adapted to be disposed between the head of the bolt 38 and the inner wall of the cup 29 so as to support the arcuate contact 41 in the position illustrated in Fig. 4.

A nut 44 secures the end of an electrical conductor 45 between the nut 40 and itself. It is therefore apparent that one side of an electrical circuit is directed to the contact 41 and it is also apparent that the cup 29 is charged with this same electric circuit but inasmuch as the cup 29 is insulated from its supports in the manner described and since said cup bears against the ring 23 which is of insulating material, it is apparent that said cup is electrically isolated.

Conductors 46 and 47 are connected to the contacts 25 and 24 and said conductors are also respectively connected to the lamps in the lamp structures 10 and 11. The conductor 45 is connected to the conductor 48 which is directed to the tail lamp structure 49 of the vehicle. The conductor 48 is also connected to the usual ignition and lighting control switch indicated by 50 in the drawing, one terminal of this switch being connected to the positive terminal of a battery 51 by a conductor 52, the negative terminal of said battery being grounded as indicated at 53 in the drawing.

It is apparent that since the cup 29 is supported from the frame of the vehicle it will be stationary and therefore the contact 41 carried thereby will also be stationary. As has been pointed out the insulating ring 23 and therefore the contacts 24 and 25 move with the toggle arm 17 when the steering mechanism is operated. Therefore when the toggle arm 17 moves so as to cause the wheels to direct the vehicle around a corner, either the contact 24 or 25 will be moved into engagement with the contact 41. If the switch 50 is closed a circuit will be set up from the battery 51 through the conductor 52, switch 50, conductor 48, conductor 45, contact 41, and either contact 24 or 25 and therefore either conductor 47 or 46 will conduct the current to the lamp in either the lamp structure 11 or 10 from whence it will pass into the grounded side of the circuit through which it will pass back to the battery 51. It is apparent that the contacts 24 and 25 and the conductors leading therefrom will be arranged so as to ignite the lamp directed in the direction in which the vehicle is to be turned.

From the foregoing it is apparent that I have provided a device which will illuminate the road to be traveled when a vehicle is turning a corner. It is also apparent that I have formed this device such that the mechanism will function only at a time when the vehicle is turning and it is apparent that the device is so arranged that it will operate only in the direction in which the vehicle is to travel.

While I have illustrated and described the preferred form of construction for carrying my invention into effect, this is capable of variation and modification, without departing from the sprit of the invention. I, therefore, do not wish to be limited to the precise details of construction set forth, but desire to avail myself of such variation and modifications as come within the scope of the appended claim.

Having thus described my invention, what I claim as new and desire to protect by Letters Patent is:

In a switch structure, a disc mounted on a movable arm, an annular supporting member carried by said disc, an annular insulating ring carried by said supporting member and peripherally extending therefrom, contacts mounted on said insulating ring in spaced apart relation, a cup including a peripheral flange embracng the periphery of said insulating ring, means for stationarily supporting said cup carried by supporting means for said movable arm, means providing an axis and extended through said supporting member and said cup to interconnect said cup and said supporting member whereby when said movable arm is moved, said supporting member and said insulating ring will be moved circumferentially with respect to said cup, and an arcuate contact disposed intermediate said cup and said supporting member and carried by said cup, said arcuate contact serving to close the circuit between said contacts when said contacts are moved with said insulating ring into a position to engage said arcuate contact.

In testimony whereof I affix my signature.

LIDO CIOMEI.